United States Patent [19]

Peruth et al.

[11] Patent Number: 4,593,347
[45] Date of Patent: Jun. 3, 1986

[54] BLOCKING OSCILLATOR SWITCHED MODE POWER SUPPLY

[75] Inventors: Günther Peruth; Michael Lenz, both of Munich, Fed. Rep. of Germany

[73] Assignee: Siemens Aktiengesellschaft, Berlin and Munich, Fed. Rep. of Germany

[21] Appl. No.: 588,256

[22] Filed: Mar. 12, 1984

[30] Foreign Application Priority Data

Apr. 5, 1983 [DE] Fed. Rep. of Germany ....... 3312209

[51] Int. Cl.[4] ..................... H02P 13/22; H02M 3/335
[52] U.S. Cl. ...................................... 363/21; 331/112; 363/37
[58] Field of Search ...................... 363/21, 37, 97, 131, 363/132, 133; 331/112, 146, 148

[56] References Cited

U.S. PATENT DOCUMENTS

| 4,017,787 | 4/1977 | Hara et al. | 363/49 |
| 4,335,423 | 6/1982 | Koizumi et al. | 363/21 |
| 4,450,514 | 5/1984 | Peruth | 363/37 |
| 4,481,565 | 11/1984 | Colton | 363/21 |

FOREIGN PATENT DOCUMENTS 3032034  3/1982  Fed. Rep. of Germany .

OTHER PUBLICATIONS

Funkschau 1975, "Ein Sperrwandler–Netzmodul mit Netztrennung", Dangschat et al., pp. 40 to 43.
"Schaltnetzteile", by Wuestehube et al., pp. 182 to 183.
"Schaltnetzteile mit der IS TDA 4600", Siemens publication, pp. 6 and 7.

Primary Examiner—Patrick R. Salce
Assistant Examiner—D. L. Rebsch
Attorney, Agent, or Firm—Thomas H. Jackson

[57] ABSTRACT

An improved blocking oscillator switched mode power supply, which is protected against a voltage rise on the primary side of a transformer of the switched mode power supply, which occurs in a no-load operation and could endanger the circuit. In a design of the blocking oscillator switched mode power supply according to the invention, the output of the variable gain amplifier, connected in known manner to an input of the pulse duration modulator (or pulse width modulator) of the control circuit of the blocking oscillator, is connected through an operational amplifier, which serves as comparator and is actuated by an auxiliary voltage to an additional input of the pulse duration modulator. The pulse duration modulator is provided in the usual manner for controlling the base of a switching transistor, forming a connection between one end of the primary side of the transformer and the terminal for the reference potential. Furthermore, for the solution of the problem referred to in a design of the switched mode power supply corresponding to the invention, the output of a pulse processing circuit is connected via a switching circuit or respectively via a capacitor to the input of the variable gain amplifier, actuated at the same time by the output of the control voltage generator in the usual manner.

17 Claims, 5 Drawing Figures

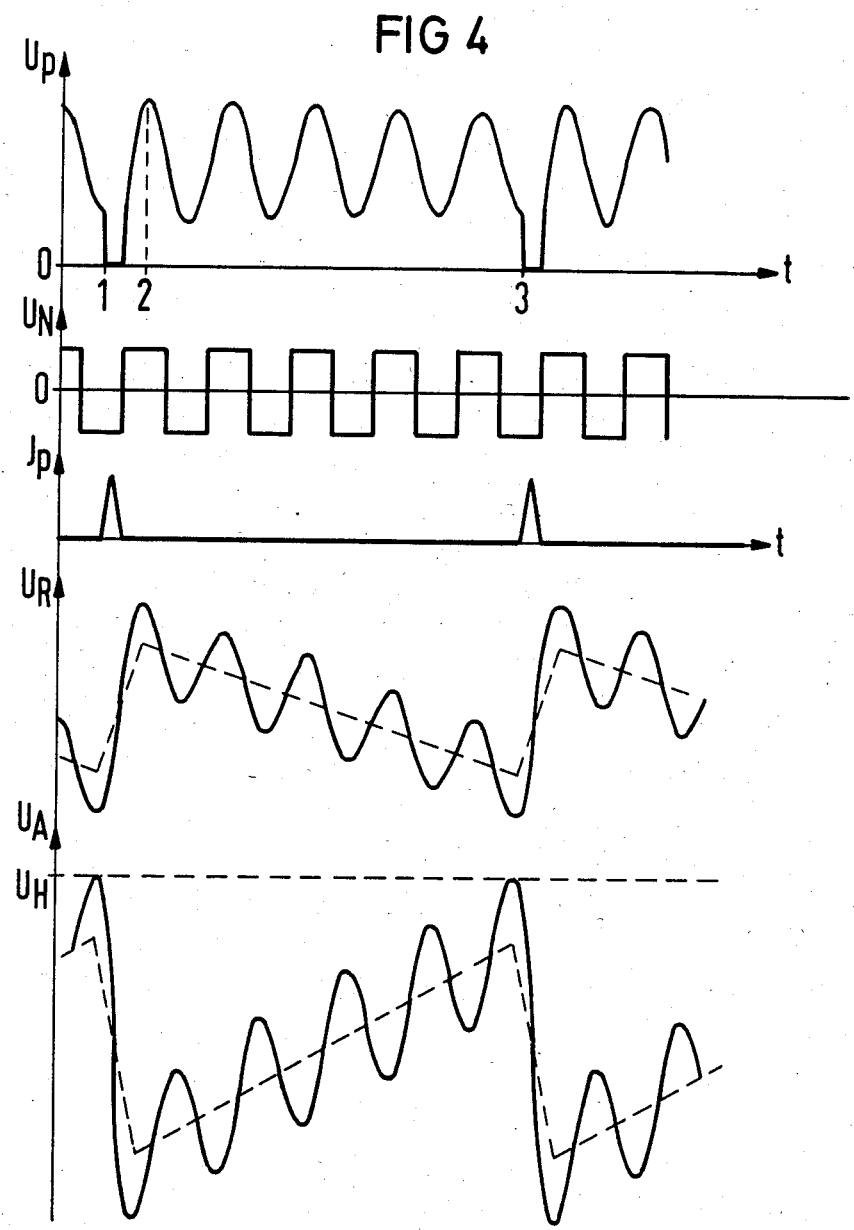

BLOCKING OSCILLATOR SWITCHED MODE POWER SUPPLY

BACKGROUND OF THE INVENTION

The invention, related to co-pending application Ser. No. 653,541, filed 24 September 1985 by the same inventors, relates to a blocking oscillator switched mode power supply for electrical equipment, in which the primary winding of a transformer in series with the currentcarrying section of an electronic switch is connected to the d-c voltage obtained by rectification of the power a-c voltage supplied via two supply terminals. A secondary winding of the transformer is provided as current supply of the electrical equipment. The power supply is, furthermore, of the type in which the control electrode of the three-electrode electronic switch is controlled by the output of a control circuit which in turn is actuated by the rectified power a-c voltage as actual value and by a set point adjuster. Also a starting circuit is provided for the further control of the control electrode of the electronic switch, and lastly the control circuit is constructed so that its current supply is provided by means of a secondary winding of the transformer. The starting circuit contains on the one hand a circuit part serving for controlling voltage generation, with following variable gain amplifier, and on the other hand a circuit part for pulse processing. The output of the variable gain amplifier as well as the output of the pulse processing system are each connected to an input of a pulse duration modulator actuating the control electrode of the electronic switch and forming the output of the control circuit. A third input of the pulse duration modulator is actuated by a current-voltage converter.

Such a blocking oscillator switched mode power supply is described for example in German patent document DE-OS No. 30 32 034 (U.S. Pat. No. 4,450,514). As additional related art may be cited "Funkschau" (1975), No. 5, p. 40–43, and the book by Wüstehube et al. titled "Schaltnetzteile" (Switched Mode Power Supplies) (published 1979 in expert-Verlag, VDE-Verlag; cf. in particular p. 182 ff) as well as Siemens "Schaltnetzteile mit der IS TDA 4600" p. 7 ff.

As is known, the function of such a switched mode power supply is to supply electrical equipment, e.g. a television receiver, with stabilized and regulated operating voltages. The core of such a switched mode power supply, therefore, is a control circuit, the control element of which is constituted by the above mentioned three-electrode electronic switch, realized in particular by a bipolar power transistor. Further there is used here a high operating switching frequency and a transformer aligned to this high operating frequency. This is desirable because an extensive isolation of the electrical equipment to be supplied from the supply network is desired. Such switched mode power supplies may be laid out either according to the synchronized mode or according to the self-heterodyning mode. The present invention deals with the latter type of switched mode power supply. Such a switched mode power supply has been described also in German patent document DE-OS No. 30 32 034.

The basic circuit diagram belonging to such a switched mode power supply is illustrated in FIG. 1, which will be discussed first.

An npn power transistor serves e.g. as the control element T for the control circuit, and is connected by its emitter-collector path in series with the primary winding of a transformer Tr. Alternatively there might be used as a control element T another three-electrode electronic switching element, e.g. a thyristor or a power MOSFET. With reference to FIG. 1 in DE-OS No. 30 32 034, it can be noted that the d-c voltage operating this series connection is obtained by rectification of the a-c voltage supplied by the a-c network by means of a rectifier circuit, e.g. a Gratz circuit. In case an npn transistor is used as switch T, the emitter of this transistor is connected to the reference potential, the collector to the primary winding $W_P$ of this transformer Tr, and the other end of this primary winding to the supply potential $+V_s$ supplied by the rectifier circuit mentioned (but not shown in the drawing). The emitter-collector path of transistor T is bridged by a capacitor $C_s$, while the capacitance $C_w$ at the primary winding $W_p$ is of a parasitic nature. The power transistor T is controlled at its base by the output part of the above mentioned control circuit, i.e. by the pulse duration modulator PDM provided therein.

A secondary winding $W_2$ of the transformer Tr serves as sensor for the control circuit and therefore is connected by one end to said reference potential and by the other end to the input of the control circuit RS. An additional secondary winding $W_1$ forms the actual secondary side of the blocking oscillator transformer Tr; it is provided for the actuation of the rectifier system, and the latter for the actuation of an electrical equipment $R_L$. The d-c voltage supplied by the rectifier system GL is designated by $U_s$ for the purposes of the following exposition.

As has been indicated at the beginning, the control circuit RS consists of the output circuit part PDM which controls the transistor T and is designed as a pulse duration modulator, and of two input parts controlled by the sensor winding $W_2$. One input part RSE serves for control voltage generation and for supplying via a control amplifier RV and control signal $U_A$ for the output part PDM. The other part IAB serves for pulse processing and supplies a signal $U_N$ to the output part PDM of the control circuit RS. Lastly there is provided a current-voltage converter SSW, which forms the actual value control of the control circuit and supplies a voltage $U_{JP}$ proportional to the primary current $J_P$ to the pulse duration modulator PDM. The last-named parts of the control circuit RS are also shown in the DE-OS No. 30 32 034 patent document. They belong to the control circuit illustrated in FIG. 3. The control voltage generation is effected by the resistors R5 and R4 appearing in FIGS. 1 and 2. The pulse processor IAB consists, as shown in FIG. 3 of the DE-OS document, of a zero crossing identification and the control logic actuated by it. The pulse duration modulator PDM lastly is constituted by the trigger circuit indicated in DE-OS No. 30 32 034 with the part of the control logic actuated by it.

In FIG. 2 is shown the timing diagram belonging to a circuit according to FIG. 1, that is, the time response of the signals occurring in the control circuit RS, namely $U_2$ (=signal supplied by the transformer winding for controlling the control circuit), $U_N$(=signal supplied by the pulse processor IAB), $J_P$(=current supplied by the transformer winding $W_P$ in series with the switching transistor T) and $U_{JP}$(=the actual-value signal supplied by the current-voltage converter SSW).

As is evident, the voltage U2 supplied by the secondary transformer winding W₂ supplies with the zero crossing (U₂=0 V) the information that the energy stored in transformer Tr has been discharged and that a new charging cycle can begin, i.e. the switch constituted by transistor T can be closed. This information is communicated to the pulse duration modulator PDM via the pulse processing stage IAB. (There applies in this case: $U_N<0$ V→pulse start, $U_N>0$ V→pulse start not possible.)

Further there is obtained from the signal voltage U₂ supplied by the secondary winding W₂ of transformer Tr a voltage proportional to the secondary voltage $U_s$, and via the control voltage generator RSE the control voltage $U_R$. In the variable gain amplifier RV, the control voltage $U_R$ is compared with a reference. The difference between the signal voltage supplied to the pulse duration modulator PDM by the variable gain amplifier RV and the reference is communicated by the control output voltage $U_A$, which is supplied by the output of the variable gain amplifier RV, to the pulse duration modulator PDM, which compares it with the signal $U_{JP}$ of the current-voltage converter SSW and opens the switch constituted by transistor T as soon as $U_{JP}=U_A$. In this manner the peak value $J_{pmax}$ of $J_P$ is corrected until the difference between $U_R$ and the reference voltage disappears. This means that $U_R$ and hence $U_s$ remain constant.

As has been mentioned above, FIG. 2 illustrates the most important signals of the circuit of FIG. 1. Concerning the theory, reference can be made to the cited book "Schaltnetzteile" by Wüstehube. It conveys the following information: Upon load relief of the self-heterodyning blocking oscillator, the frequency must rise. Theoretically it tends toward infinity at no-load. In practice, however, it is limited at the natural frequency of the system. It is calculated from the parallel resonance of the components $L_p$(=primary inductance) and $C_s//C_w$(cf. FIG. 1). With the natural frequency and the minimum pulse width, which is determined essentially by the properties of the switching transistor T, the minimum possible power output is established. If load relief is continued, the secondary voltage increases and accordingly also the primary voltage in the blocking phase (=voltage between emitter and collector of the transistor T), until the switch constituted by transistor T, the transformer Tr, of another part of the circuit suffers damage.

At attempt at overcoming this disadvantage of the known blocking oscillator switched mode power supplies has heretofore been achieved by simply connecting a socalled basic load, which it was important not to turn off, or a dissipative protection circuit in series with the protective capacitor $C_s$ in parallel connection with the transistor T. Such a solution, however, is uneconomical, since also in nominal operation (=operation at nominal load) power is consumed which considerably reduces the efficiency of the blocking oscillator.

SUMMARY OF THE INVENTION

The object of the present invention is to disclose a blocking oscillator switched mode power supply corresponding to the initially given definition in such a way that the secondary voltage $U_s$ is stabilized, in that—depending on the secondary voltage $U_s$—one or more pulse starts are spontaneously suppressed on the basis of a suitable design of the blocking oscillator switched mode power supply.

For the solution of this problem, it is proposed according to the invention that the output, serving to actuate the pulse duration modulator of the pulse processing and the control voltage generator output for actuation of the variable gain amplifier are connected together via a switching matrix. It is further proposed that the output of this variable gain amplifier comprises, in addition to the connection to the input of the pulse duration modulator associated with it, a connection to the non-inverting input of an operational amplifier, the inverting input of which is actuated by a fixed auxiliary potential, and the output of which is connected to an additional control input of the pulse duration modulator by fixing the value of the auxiliary potential, a response threshold is set for response of the pulse duration modulator to the signal supplied to it by the output of the variable gain amplifier.

Other features and advantages of the invention will be apparent from the following description of the preferred embodiments, and from the claims.

For a full understanding of the present invention, reference should now be made to the following detailed description of the preferred embodiments of the invention and to the accompanying drawings.

BRIEF DESCRIPTION OF THE DRAWINGS

FIG. 4 shows a timing diagram for the power supply in accordance with the present invention.

DETAILED DESCRIPTION

Figure 1:
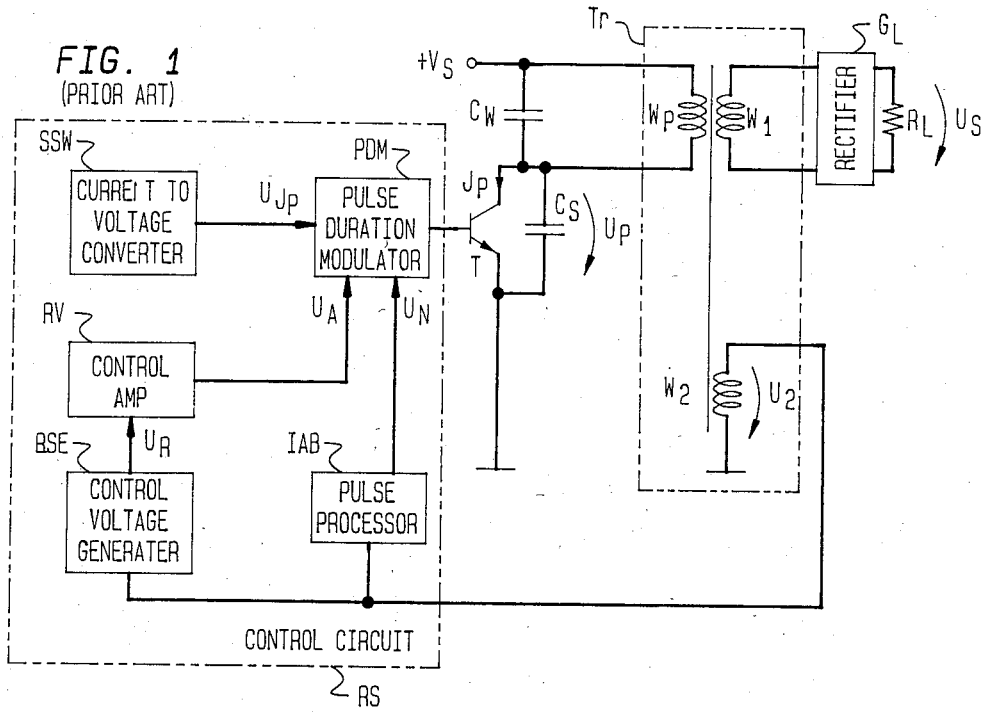
FIGS. 1 and 2 show a typical switched mode power supply and its associated timing diagram.
Figure 2:
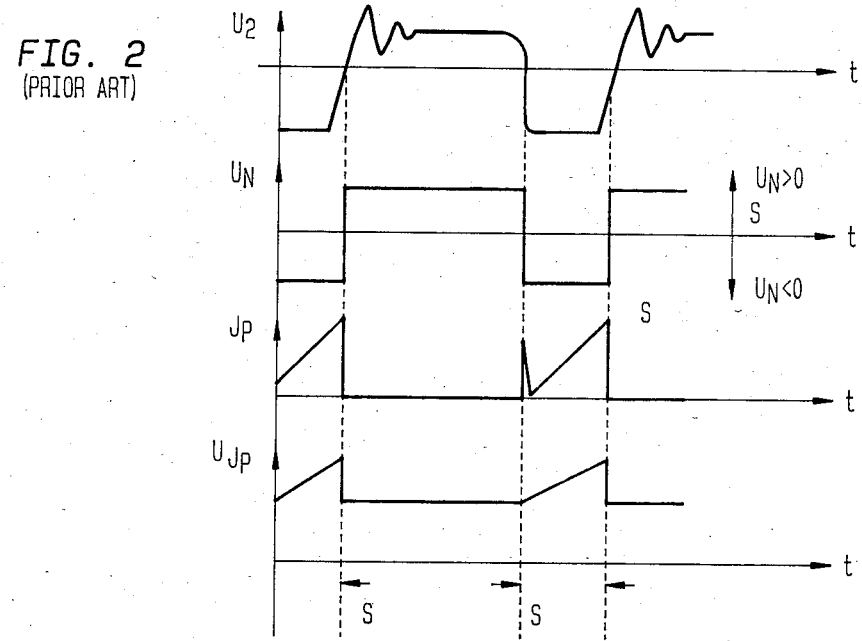
Figure 3:
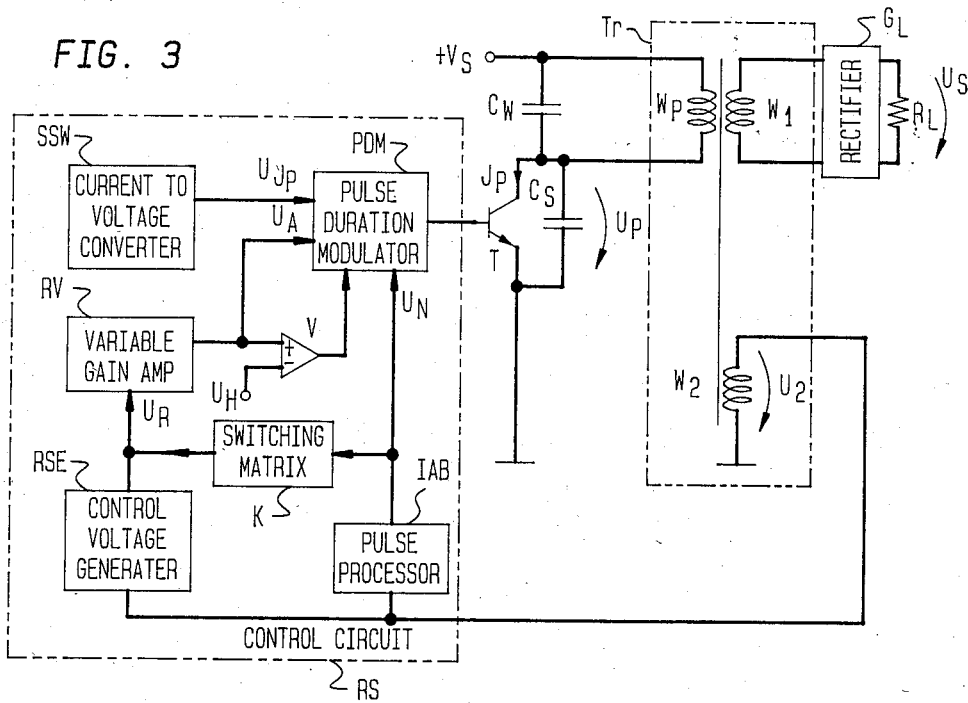
FIG. 3 shows the improved power supply in accordance with the present invention.

The block structure, shown in FIG. 3, of the blocking oscillator switched mode power supply according to the invention differs from the known structure of FIG. 1 in that, for one thing, the output of the variable gain amplifier RV is provided not only to the normally constructed input of the pulse duration modulator PDM, controlled through the signal $U_A$, but it is also for controlling the non-inverting input of an operational amplifier V acting as a comparator. This comparator V is actuated at its inverting input by a freely selectable auxiliary voltage $U_H$ and controls by its output an additional control input of the pulse duration modulator PDM, which is designed in the sense of the above definition.

A second difference is the presence of the switching circuit K, which is actuated from the output of the pulse processing system, IAB and which in turn—together with the control voltage generator RSE—controls the variable gain amplifier RV and hence exerts an influence on the control signal $U_A$ supplied by the output of the variable gain amplifier RV.

Now on the basis of the additions to the known circuit as provided by the invention, starting with a secondary voltage $U_s$ (which, of course, rises)—selectable through the auxiliary voltage $U_H$—the comparator V is activated, which then blocks the pulse duration modulator PDM as long as the voltage $U_A$ supplied by the output of the variable gain amplifier RV is lower than said auxiliary voltage $U_H$. Looking at the time diagrams of FIG. 4 for the control signals starting from time 1 (cf.

the diagram for $U_P$), the following response is seen: At time 1, the electronic switch constituted by transistor T is closed ($J_P$ rises) and is opened again after the minimum pulse width is reached, which because of the constant duty cycle results in the natural frequency of the system. This causes the secondary voltage $U_s$ and accordingly also the control voltage $U_R$ at the input of the variable gain amplifier RV to increase, as can be seen from FIG. 4. The switching threshold of comparator V appears shortened (see time 2). The system which supplies the signal $U_P$ then oscillates at the natural frequency—damped only by the control winding load and by the insulation resistances. All start commands now originating from the pulse processing system IAB ($U_N<0$) remain ineffective as long as $U_A<U_H$. As the control voltage $U_R$ collapses at non-recurring load cycle of the primary side $W_P$ of transformer TR, as does also the secondary voltage $U_s$, the signal $U_A$ supplied by the variable gain amplifier RV to the pulse duration modulator PDM rises versus time (cf. FIG. 4: time interval 2 to 3).

The switching circuit K, designed in the case of the example as band pass filter and tuned to the natural frequency, filters the fundamental wave out of the voltage $U_N$ (square wave voltage) and superimposes it on the control voltage $U_R$. Alternatively, however, as has been indicated before, the switching circuit K may be a quadrupole designed for example as a low-pass or high-pass filter. In general, what is important is only a capacitive connection between the output of IAB and the input of RV, so that the switching circuit K may be constituted also by a capacitor (cf. FIG. 5). For the operation of a blocking oscillator switched mode power supply according to the invention one needs only fundamental wave maxims and fundamental wave minims.

Through the superposition, it is accomplished by means of the comparator V that the new charging cycle occurs in a well-defined manner, always in the negative maximum of the natural oscillation (time 1 and time 3 in FIG. 4). The charge reversal losses, caused by the capacitance $C_s$ connected in parallel with the switching transistor T, thus remain minimal (because $U_P$ also has a minimum). The circuit now regulates the secondary voltage $U_s$ by the frequency division of the natural oscillation.

Figure 5:
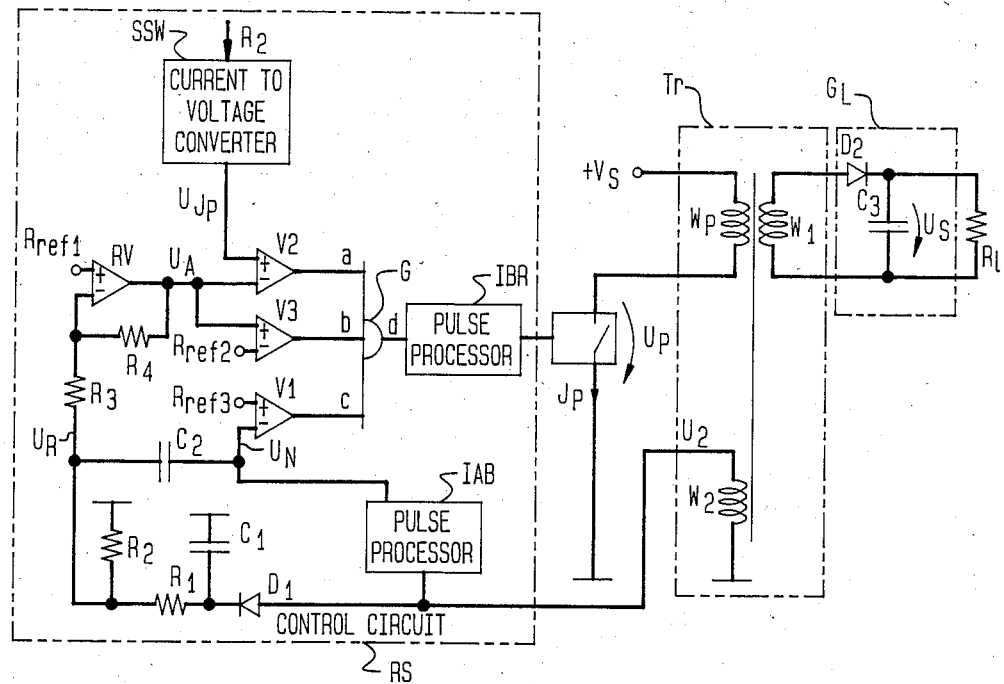
FIG. 5 shows a preferred circuit embodiment of the invention.

An advantageous development of the blocking oscillator switched mode power supply shown in FIG. 3 will now be presented with reference to FIG. 5. Here the control voltage generator RSE actuated by the secondary winding $W_2$ is constituted by the combination of a diode D1 with two resistors R1 and R2 and a capacitor C1. The anode of diode D1 is connected directly to the secondary winding $W_2$ of transformer Tr, and its cathode is connected firstly via capacitor C1 and secondly via the series connection of the two resistors R1 and R2 to the reference potential (ground). The control voltage $U_R$ for the variable gain amplifier RV is taken at the tap point between the two resistors R1 and R2. Thus the control voltage generation consists of a loaded half-wave rectification with the diode D1 as rectifier, which conducts during the blocking phase (switch T is open), with the capacitor C1 as charging capacitor, and with the two resistors R1 and R2 as load resistances. The variable gain amplifier Rv is realized as an operational amplifier. The non-inverting input of the operational amplifier is connected to reference potential $U_{ref1}$. The inverting input is connected via a resistor R4 to the output of the operational amplifier RV and is moreover actuated via a resistor R3 by the output of the control voltage generator. By reversing the polarity of the diode D1 in the control voltage generator, the amplifier RV could alternatively be operated as a non-inverting amplifier, for which purpose, however, also the winding direction of $W_2$ would have to be reversed.

The capacitor C2, which is actuated on the one hand from the output of the control voltage generator and, on the other hand, from the output of the pulse processor IAB, is connected to the inverting input of an additional operational amplifier V1, which already forms an input of the pulse duration modulator PDM. Capacitor C2 functions as a switching matrix K. It differentiates the voltage $U_2$ limited by the pulse processor IAB to the value of $U_N$, superposing this voltage value on the control voltage $U_R$. If $U_N<U_{ref3}$ ($U_{ref3}$ is the reference voltage serving to actuate the non-inverting input of the last-named operational amplifier V1), then the operational amplifier V1 functioning as comparator clears the input c of the AND gate G forming the core of the pulse duration modulator PDM (c=high). To allow the pulse start to take place (=output d of the AND gate G has level "high"), the equation $$d=(U_{JP}>U_A)\ (U_A>U_{ref2})\ (U_{ref3}>U_N)$$

must be satisfied. One sees that the comparator constituted by the operational amplifier V3 (designated in FIG. 3 by the reference symbol "V") can block the comparator constituted by an additional operational amplifier V2 and controlled by the signal $U_{JP}$ at its non-inverting input when the control voltage $U_R$ exceeds a certain value (which is defined by the auxiliary voltage $U_{ref2}=U_H$ according to FIG. 3).

The current-voltage converter SSW is actuated by the current flowing through the primary winding $W_P$ and can function as direct current interrogation by means of a resistance in the ground branch of switch T or else of the principle of $J_P$ simulation (as described in the Siemens publication "Schaltnetzteile mit der IS TDA 4600" by E. Paulik and G. Peruth (1981) on p. 7, column 1).

The electronic switch T, which may be either a bipolar power transistor or a power MOS transistor or a thyristor, is driven via the pulse processor IBR, which is controlled by output d of the AND gate G.

To produce the secondary voltage $U_s$, the rectifier diode D2 in the rectifier circuit GL operated by the secondary winding $W_1$ of transformer Tr is designed in such a way that it conducts in the blocking phase (i.e. when switch T is open). Capacitance C3 serves as charging capacitor with respect to the generation of $U_s$.

As to the description of the function of the switching circuit constituted by capacitor C2, the following should additionally be noted: In accordance with the above statements, this capacitor C2 differentiates the voltage $U_2$ limited to the value $U_N$ by the pulse processor IAB and superposes it on the control voltage $U_R$, where $|X_{C2}|>>R2$ (at the natural frequency of the system). Capacitor C2, therefore, rotates the phase of $U_N$ by approximately 90°. This phase rotation is compensated by the low-pass behavior of the variable gain amplifier Rv, so that the turn-on condition "close T when $U_P$ has a minimum" remains valid. The advantage of this design of the switching circuit K illustrated in FIG. 5 is that in nominal operation (i.e. operation at low frequency, whereby $X_{c2}$ assumes greater values) can hardly cause a control error. Typical values for C2 are 20–100 pF, if R2 is rated to about 1 k ohms.

There has thus been shown and described a novel switching power supply which fulfills all the objects and advantages sought therefor. Many changes, modifications, variations and other uses and applications of the subject invention will, however, become apparent to those skilled in the art after considering this specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:

1. In a blocking oscillator switched mode power supply for supplying power to electrical equipment, wherein the primary winding of a transformer is connected in series with a current-carrying section of a three electrode electronic switch, the primary winding being connected to a d-c voltage obtained by rectification of an a-c voltage supplied via two supply terminals, and a secondary winding of the transformer is provided as a current supply to the electrical equipment, wherein furthermore a control electrode of the three-electrode electronic switch is controlled by the output of a control circuit, the control circuit comprising a pulse duration modulator actuated by, firstly, a rectified power a-c voltage output as a control voltage or an actual value and, secondly by a set point adjuster, wherein further a starter circuit is provided for a third control of the pulse duration modulator, and wherein the control circuit is constructed so that its alternating current voltage supply is provided by means of a secondary winding of the transformer, the control circuit further comprising a first circuit part serving for the actuatal or control voltage generation, having included therein a variable gain amplifier and a second circuit part, or the starter circuit, for pulse processing and providing a start signal, the output of the variable gain amplifier as well as the output of the second circuit part for pulse processing being each connected to an input of the pulse duration modulator for actuating the control electrode of the electronic switch, the output of the pulse duration modulator being the output of the control circuit, while a third control input of the pulse duration modulator is actuated by a current-voltage converter of the control circuit serving as the set point adjuster, characterized by an improvement to the control circuit, the improvement comprising a switching circuit and an operational amplifier, the output of the operational amplifier serving as a fourth control input to actuate the pulse duration modulator (PDM), the output of the circuit part (IAB) for pulse processing and the control voltage generator output for actuation of the variable gain amplifier (RV) being connected together via said switching circuit (K;C2), and the output of the variable gain amplifier (RV) comprising in addition to being connected to the input of the pulse duration modulator (PDM) associated with it, being connected to the non-inverting input of said operational amplifier (V), the inverting input of which is actuated by a fixed auxiliary potential ($U_H$), and the output of which is connected to an additional control input of the pulse duration modulator (PDM), the design of this additional control input to the pulse duration modulator (PDM) being such that a response threshold voltage level is established by the value of the auxiliary potential ($U_H$) for response of the pulse duration modulator (PDM) to the signal ($U_A$) supplied to it by the output of the variable gain amplifier (RV).

2. Device according to claim 1, wherein through said switching circuit (K; or C2) in combination with the variable gain amplifier (RV) and with the operational amplifier (V; V3), controlled by the output of this variable gain amplifier (RV) at its non-inverting input and acting as a comparator, it is achieved that the three-electrode electronic switch (T) can be switched on only in the negative maximum of the primary voltage ($U_p$) supplied by the primary winding ($W_p$) when a complete load relief of the secondary side ($W_1$) of the transformer (Tr) exists.

3. Device according to claim 1, wherein said electronic switch (T) comprises a bipolar transistor.

4. Device according to claim 2, wherein said electronic switch (T) comprises a bipolar transistor.

5. Device according to claim 3, wherein said electronic switch (T) comprises a bipolar transistor of the npn type, whose emitter is connected to the reference potential, whose collector is connected via the primary winding of the transformer (Tr) to the supply potential ($+V_s$) obtained by rectification of the supply voltage, and whose emitter-collector path is bridged by a capacitor ($C_s$), while its base is controlled by the output of the pulse duration modulator (PDM).

6. Device according to claim 4, wherein said electronic switch (T) comprises a bipolar transistor of the npn type, whose emitter is connected to the reference potential, whose collector is connected via the primary winding of the transformer (Tr) to the supply potential ($+V_s$) obtained by rectification of the supply voltage, and whose emitter-collector path is bridged by a capacitor ($C_s$), while its base is controlled by the output of the pulse duration modulator (PDM).

7. Device according to claim 1, wherein said variable gain amplifier which is actuated at its non-inverting input by a first reference voltage ($U_{ref1}$) and is constituted by a first operational amplifier (RV) is connected to its own output via a resistor (R4) at its inverting input actuated by the output of the control voltage generator and of the switching circuit (K)—realized by a capacitor (C2)—and that this output of the variable gain amplifier (RV) is connected directly to the inverting input of an additional operational amplifier (V2)—actuated at the other input by the current-voltage converter acting as set point adjuster and forming an input of the pulse duration modulator (PDM)—and is connected furthermore to the non-inverting input of the operational amplifier (V3)—actuated at the inverting input by the auxiliary voltage ($U_{ref2}=U_H$)—, that furthermore the output of the pulse processing system (IAB), applied to the switching circuit (C2), is connected to the inverting input of an additional operational amplifier (V1) forming an input of the pulse duration modulator in the same manner as the two operational amplifiers (V2, V3) actuated by the output of the variable gain amplifier (RV), and the other input of the additional operational amplifier (V1) is actuated by an additional reference voltage ($U_{ref3}$), that further each of the operational amplifiers (V2, V3, V1) forming one of three inputs of the pulse duration modulator (PDM) is connected to one of the inputs (a, b, c) of a further included AND gate (G), the output of which serves—through an additional pulse processing system (IBR)—to actuate the control electrode of the electronic switch (T).

8. Device according to claim 2, wherein said variable gain amplifier which is actuated at its non-inverting input by a first reference voltage ($U_{ref1}$) and is constituted by a first operational amplifier (RV) is connected to its own output via a resistor (R4) at its inverting input actuated by the output of the control voltage generator and of the switching circuit (K)—realized by a capacitor (C2)—and that this output of the variable gain amplifier (RV) is connected directly to the inverting input of an additional operational amplifier (V2)—actuated at the other input by the current-voltage converter acting as set point adjuster and forming an input of the pulse duration modulator (PDM)—and is connected furthermore to the non-inverting input of the operational amplifier (V3)—actuated at the inverting input by the auxiliary voltage ($U_{ref2}=U_H$)—, that furthermore the output—of the pulse processing system (IAB), applied to the switching circuit (C2), is connected to the inverting input of an additional operational amplifier (V1) forming an input of the pulse duration modulator in the same manner as the two operational amplifiers (V2, V3) actuated by the output of the variable gain amplifier (RV), and the other input of the additional operational amplifier (V1) is actuated by an additional reference voltage ($U_{ref3}$), that further each of the operational amplifiers (V2, V3, V1) forming one of three inputs of the pulse duration modulator (PDM) is connected to one of the inputs (a, b, c) of a further included AND gate (G), the output of which serves—through an additional pulse processing system (IBR)—to actuate the control electrode of the electronic switch (T).

9. Device according to claim 3, wherein said variable gain amplifier which is actuated at its non-inverting input by a first reference voltage ($U_{ref1}$) and is constituted by a first operational amplifier (RV) is connected to its own output via a resistor (R4) at its inverting input actuated by the output of the control voltage generator and of the switching circuit (K)—realized by a capacitor (C2)—and that this output of the variable gain amplifier (RV) is connected directly to the inverting input of an additional operational amplifier (V2)—actuated at the other input by the current-voltage converter acting as set point adjuster and forming an input of the pulse duration modulator (PDM)—and is connected furthermore to the non-inverting input by the auxiliary voltage ($U_{ref2}=U_H$)—, that furthermore the output of the pulse processing system (IAB), applied to the switching circuit (C2), is connected to the inverting input of an additional operational amplifier (V1) forming an input of the pulse duration modulator in the same manner as the two operational amplifiers (V2, V3) actuated by the output of the variable gain amplifier (RV), and the other input of the additional operational amplifier (V1) is actuated by an additional reference voltage ($U_{ref3}$), that further each of the operational amplifiers (V2, V3, V1) forming one of three inputs of the pulse duration modulator (PDM) is connected to one of the inputs (a, b, c) of a further included AND gate (G), the output of which serves—through an additional pulse processing system (IBR)—to actuate the control electrode of the electronic switch (T).

10. Device according to claim 4, wherein said variable gain amplifier which is actuated at its non-inverting input by a first reference voltage ($U_{ref1}$) and is constituted by a first operational amplifier (RV) is connected to its own output via a resistor (R4) at its inverting input actuated by the output of the control voltage generator and of the switching circuit (K)—realized by a capacitor (C2)—and that this output of the variable gain amplifier (RV) is connected directly to the inverting input of an additional operational amplifier (V2)—actuated at the other input by the current-voltage converter acting as set point adjuster and forming an input of the pulse duration modulator (PDM)—and is connected furthermore to the non-inverting input of the operational amplifier (V3)—actuated at the inverting input by the auxiliary voltage ($U_{ref2}=U_H$)—, that furthermore the output of the pulse processing system (IAB), applied to the switching circuit (C2), is connected to the inverting input of an additional operational amplifier (V1) forming an input of the pulse duration modulator in the same manner as the two operational amplifiers (V2, V3) actuated by the output of the variable gain amplifier (RV), and the other input of the additional operational amplifier (V1) is actuated by an additional reference voltage ($U_{ref3}$), that further each of the operational amplifiers (V2, V3, V1) forming one of three inputs of the pulse duration modulator (PDM) is connected to one of the inputs (a, b, c) of a further included AND gate (G), the output of which serves—through an additional pulse processing system (IBR)—to actuate the control electrode of the electronic switch (T).

11. Device according to claim 1, wherein the input of the control voltage generator (RSE) actuated by one secondary winding (W2) of the transformer (Tr) is constituted by one terminal of a diode (D1), the other terminal of which is connected on the one hand via a capacitor (C1) and on the other hand via the series connection of two resistors (R1, R2), to the reference potential (ground), and that a tap point lying between the two resistors (R1, R2) supplies the voltage ($U_R$) required for the actuation of the variable gain amplifier (RV).

12. Device according to claim 2, wherein the input of the control voltage generator (RSE) actuated by one secondary winding (W2) of the transformer (Tr) is constituted by one terminal of a diode (D1), the other terminal of which is connected on the one hand via a capacitor (C1) and on the other hand via the series connection of two resistors (R1, R2), to the reference potential (ground), and that a tap point lying between the two resistors (R1, R2) supplies the voltage ($U_R$) required for the actuation of the variable gain amplifier (RV).

13. Device according to claim 3, wherein the input of the control voltage generator (RSE) actuated by one secondary winding (W2) of the transformer (Tr) is constituted by one terminal of a diode (D1), the other terminal of which is connected on the one hand via a capacitor (C1) and on the other hand via the series connection of two resistors (R1, R2), to the reference potential (ground), and that a tap point lying between the two resistors (R1, R2) supplies the voltage ($U_R$) required for the actuation of the variable gain amplifier (RV).

14. Device according to claim 5, wherein the input of the control voltage generator (RSE) actuated by one secondary winding (W2) of the transformer (Tr) is constituted by one terminal of a diode (D1), the other terminal of which is connected on the one hand via a capacitor (C1) and on the other hand via the series connection of two resistors (R1, R2), to the reference potential (ground), and that a tap point lying between the two resistors (R1, R2) supplies the voltage ($U_R$) required for the actuation of the variable gain amplifier (RV).

15. Device according to claim 7, wherein the input of the control voltage generator (RSE) actuated by one secondary winding (W2) of the transformer (Tr) is constituted by one terminal of a diode (D1), the other terminal of which is connected on the one hand via a capacitor (C1) and on the other hand via the series connection of two resistors (R1, R2), to the reference potential (ground), and that a tap point lying between the two resistors (R1, R2) supplies the voltage ($U_R$) required for the actuation of the variable gain amplifier (RV).

16. Device according to claim 11, wherein the tap point between the two resistors (R1, R2) forming the output of the control voltage generator (RSE) is connected directly to the switching circuit and furthermore, via a resistor (R3), with the input of the variable gain amplifier (RV).

17. Device according to claim 11, wherein the tap point between the two resistors (R1, R2) forming the output of the control voltage generator (RSE) is connected directly and furthermore, via a resistor (R3), with the input of the variable gain amplifier (RV), the output of variable gain amplifier (RV) being connected via a resistor (R4) to its inverting input.

* * * * *